(12) United States Patent
Fox et al.

(10) Patent No.: US 9,527,000 B1
(45) Date of Patent: Dec. 27, 2016

(54) CRIB MOBILE AND MOUNTING STRUCTURE THEREFOR

(71) Applicant: PlayAbility Toys, LLC, Tucson, AZ (US)

(72) Inventors: Martin P. Fox, Tucson, AZ (US); David J. FitzGerald, Hayward, CA (US)

(73) Assignee: PLAYABILITY TOYS, LLC, Tucson, AZ (US)

( * ) Notice: Subject to any disclaimer, the term of this patent is extended or adjusted under 35 U.S.C. 154(b) by 0 days.

(21) Appl. No.: 14/720,398

(22) Filed: May 22, 2015

Related U.S. Application Data (60) Provisional application No. 62/002,059, filed on May 22, 2014.

(51) Int. Cl.
*A63H 33/00* (2006.01)
*A47D 15/00* (2006.01)
*F16B 5/06* (2006.01)

(52) U.S. Cl.
CPC ............. *A63H 33/006* (2013.01); *A47D 15/00* (2013.01); *F16B 5/06* (2013.01)

(58) Field of Classification Search
CPC ........... A63H 33/006; B21B 5/02; B21B 5/10; F16B 5/06; F16B 5/0685
See application file for complete search history.

(56) References Cited

U.S. PATENT DOCUMENTS

| | | | |
|---|---|---|---|
| 4,573,654 A | 3/1986 | Nottingham | 248/231.1 |
| 4,904,220 A | 2/1990 | Williams et al. | 446/227 |
| 5,370,570 A * | 12/1994 | Harris | A63H 33/006 24/486 |
| 5,803,786 A | 9/1998 | McCormick | 446/227 |
| 7,172,486 B2 * | 2/2007 | Drosendahl | A63H 33/006 446/175 |
| 7,476,142 B2 * | 1/2009 | Mastrosimone-Gese | A63H 33/006 446/227 |
| 7,762,865 B2 | 7/2010 | Gelfond et al. | 446/227 |
| 8,424,820 B2 | 4/2013 | Cotirla et al. | 248/228.1 |

* cited by examiner

*Primary Examiner* — John Ricci
(74) *Attorney, Agent, or Firm* — Hayes Soloway P.C.

(57) ABSTRACT

A mounting assembly for mounting a toy to a rail and for supporting said toy on said rail, includes an upper bracket and a lower bracket, the upper bracket permitting the mobile to move vertically up and down, and the lower bracket permitting the mobile to move horizontally from side to side parallel to the rail, the lower bracket also attaching to the rail and supporting the upper bracket. The brackets are constructed to be loosened to permit disinfecting, but do not completely detach.

17 Claims, 7 Drawing Sheets

CRIB MOBILE AND MOUNTING STRUCTURE THEREFOR

CROSS REFERENCE TO RELATED APPLICATION

This application claims priority from U.S. Provisional Application Ser. No. 62/002,059, filed May 22, 2014, the contents of which are incorporated herein by reference.

FIELD OF THE INVENTION

The present invention relates generally to toys, and more particularly, to a mobile that is detachably mountable to an infant's crib or playpen. The invention will be described in particular in connection with a mobile that is detachably mountable to a crib railing, although the invention also advantageously may be mounted to a playpen, highchair, car seat or the like.

BACKGROUND OF THE INVENTION

Crib toys such as mobiles have gained wide popularity as a result of their play value and ability to provide sensory stimuli to an infant. These crib toys are provided with mounting brackets to permit the mounting of the crib toy to the top rail of a crib, playpen or the like. In order to accommodate the various sizes and constructions of rails on both cribs and playpens, as well as other such infant confining devices, these mounting brackets have been constructed in various forms, for example, interlocking flexible straps, threaded T-shaped plugs, and the like. However, these mounting brackets due to their universal mounting characteristic have generally been awkward to use during both installation and removal of the crib toy. In addition, these mounting brackets often have been found either difficult or unsuitable for raising the crib toy upwardly as the infant gains the ability to reach and/or stand up in the crib, so as to position the crib toy in its optimum location with respect to the infant for maximum play value and sensory stimulation.

Another problem with conventional crib toys such as mobile toys and mobile toy mountings is that, once installed on a crib or the like, it is difficult to quickly move the mobile out of the way, e.g. when reaching in for the infant. This problem can be an inconvenience under normal circumstances, or quite serious in the case of an emergency situation. This can be a significant problem in a hospital pediatric or nursery intensive care setting where mobiles are commonly used.

Another problem with conventional mobiles is that they are constructed of materials, and in a manner, that does not allow them to be disinfected. Transmission of infectious diseases is a growing problem and of concern in the home environment and especially in hospital and other clinical settings.

Yet another problem with current mobiles is that they include detachable parts that are easily lost or could inadvertently end up in the child's crib posing a potential safety hazard.

Examples of prior art mobiles and mounting brackets therefor are illustrated in U.S. Pat. Nos. 4,573,654; 4,904,220; 5,803,786; 7,762,865 and 8,424,820.

SUMMARY OF THE INVENTION

It is therefore an object of the present invention to provide an improved crib toy such as a mobile and mounting therefor, which overcomes or avoids one or more of the foregoing disadvantages of the prior art.

A further object of the present invention is to provide a crib toy such as mobile toy and mounting therefor that allows the mobile to be raised and or moved from side to side quickly so that the height and position of the mobile can be matched to an infant's visual development level and/or his or her position in the crib.

Yet a further object of the present invention is to provide a crib toy such as mobile and mounting therefor that permits a caregiver to quickly move the mobile out of the way to facilitate access to the infant particularly in an emergency situation.

Yet a further object of the present invention is to provide a crib toy such as a mobile that allows for complete disinfection to reduce infectious disease transmission.

Yet a further object of the present invention is to provide a crib toy such as a mobile that has no detachable parts that could be lost or fall into a crib creating a potential safety hazard for a child.

In accordance with the present invention, there is provided a crib toy such as crib mobile and a mounting system therefore comprising an upper joint (or joints) and a bracket. The joint (or joints), allows the mobile to be moved vertically up and down. The lower bracket attaches to the crib rail, supports the joint, and allows the mobile to be moved horizontally from side to side, parallel with the crib rail. The joint(s) on the upper bracket and on the lower bracket are orthogonally aligned to one another and allow for positioning the mobile so that the height and position of the targets or viewing discs of the mobile can be matched to an infant's visual development level and/or physical development level, as the infant begins to reach, and also the infant's position in the crib. The joint(s) permits the caregiver to quickly lower and move the mobile to a side of the crib to facilitate access to the infant. The two joint version allows the mobile to moved horizontally to the side.

In one aspect of the invention there is provided a mounting assembly for mounting a toy to a rail and for supporting said toy on said rail, said mounting assembly comprising an upper bracket and a lower bracket, the upper bracket permitting the mobile to move vertically up and down, and the lower bracket permitting the mobile to move horizontally from side to side parallel to the rail, the lower bracket also attaching to the rail and supporting the upper bracket.

In one aspect of the invention the upper bracket includes a first joint which is 90° offset to a joint on the lower bracket.

In another aspect of the invention the lower bracket includes a front plate and a back plate sized and shaped to fit over the crib rail. Preferably the front plate and back plate are fixed together by a threaded bolt which in turn is threaded into receiving threads in the back plate.

The present invention also provides a crib mobile comprising a mounting assembly as above described, and a mobile arm attached at its proximal end to the mounting bracket assembly.

In one aspect of the invention the mobile comprises a plurality of targets suspended from a distal end of the arm.

In another aspect of the invention the mobile includes a rotation mechanism for rotating the targets, preferably a spring-driven or battery driven motor.

BRIEF DESCRIPTION OF THE DRAWINGS

Further features and advantages of the present invention will be seen from the following detailed description, taken in conjunction with the accompanying drawings, wherein, like numerals depict like parts, and wherein.

DETAILED DESCRIPTION OF THE PREFERRED EMBODIMENT

Figure 1:
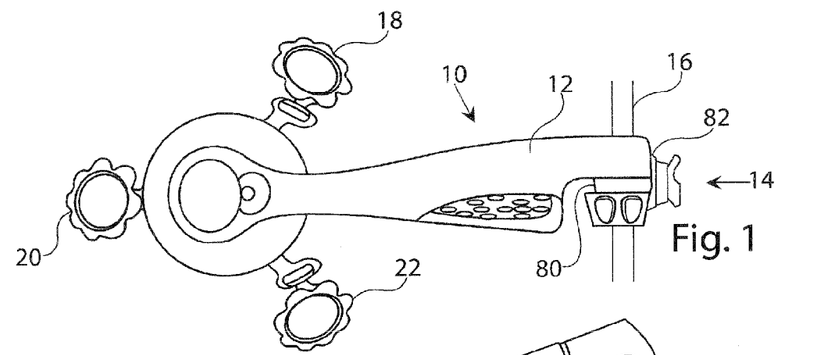
FIG. 1 is a top elevational view of a first embodiment of a mobile assembly in accordance with the present invention.
Figure 2:
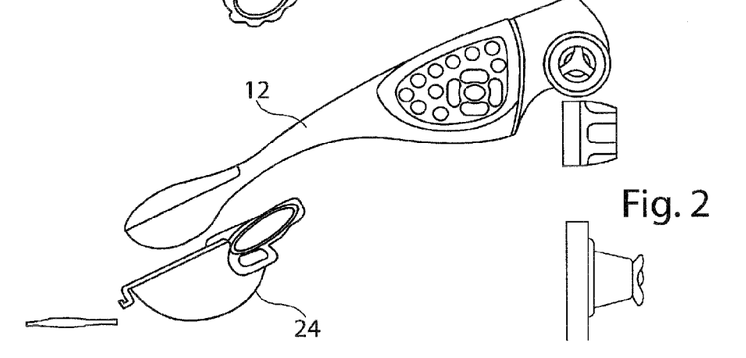
FIG. 2 is a side elevational view of the mobile assembly of FIG. 1.
Figure 3:
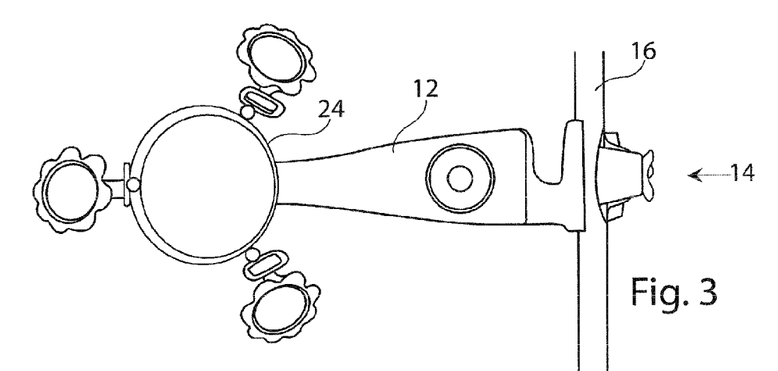
FIG. 3 is a bottom plan view of the mobile assembly of FIG. 1.

Referring to FIGS. 1-3, there is shown a crib mobile 10 in accordance with the present invention. The mobile comprises a main arm 12 attached at its proximal end to a mounting bracket assembly 14 which will be described in detail below. Bracket mounting assembly 14 in turn is mounted to a crib rail 16.

A plurality of targets or discs 18, 20, 22 are supported at a distal end of the arm 12. Three targets or discs 18, 20, 22 are shown. However, the mobile may have two, or four or more targets or discs.

The targets or discs are supported on a support hub 24 which in turn is rotatably mounted to the distal end of arm 12. A rotation drive mechanism such as a spring-driven or battery-driven motor may be provided either within the distal end of handle 12 or within support hub 24.

Targets or discs 18, 20, 22 may be colored or contain patterns or pictures to stimulate the infant. If desired, targets or discs 18, 20, 22 may be reversible on support hub 24 so that different colored or patterned targets or discs may be substituted.

Figure 4:
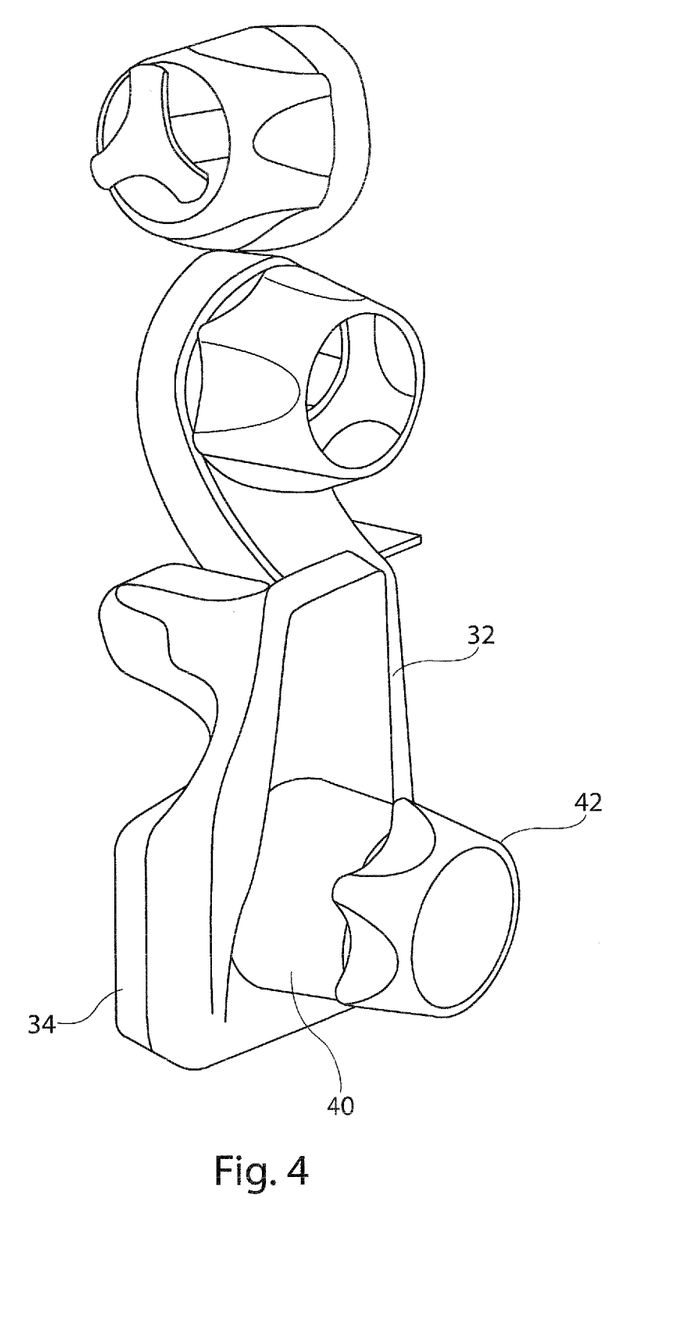
FIG. 4 is a front perspective view of the mounting bracket portion of the mobile of the present invention.
Figure 5:
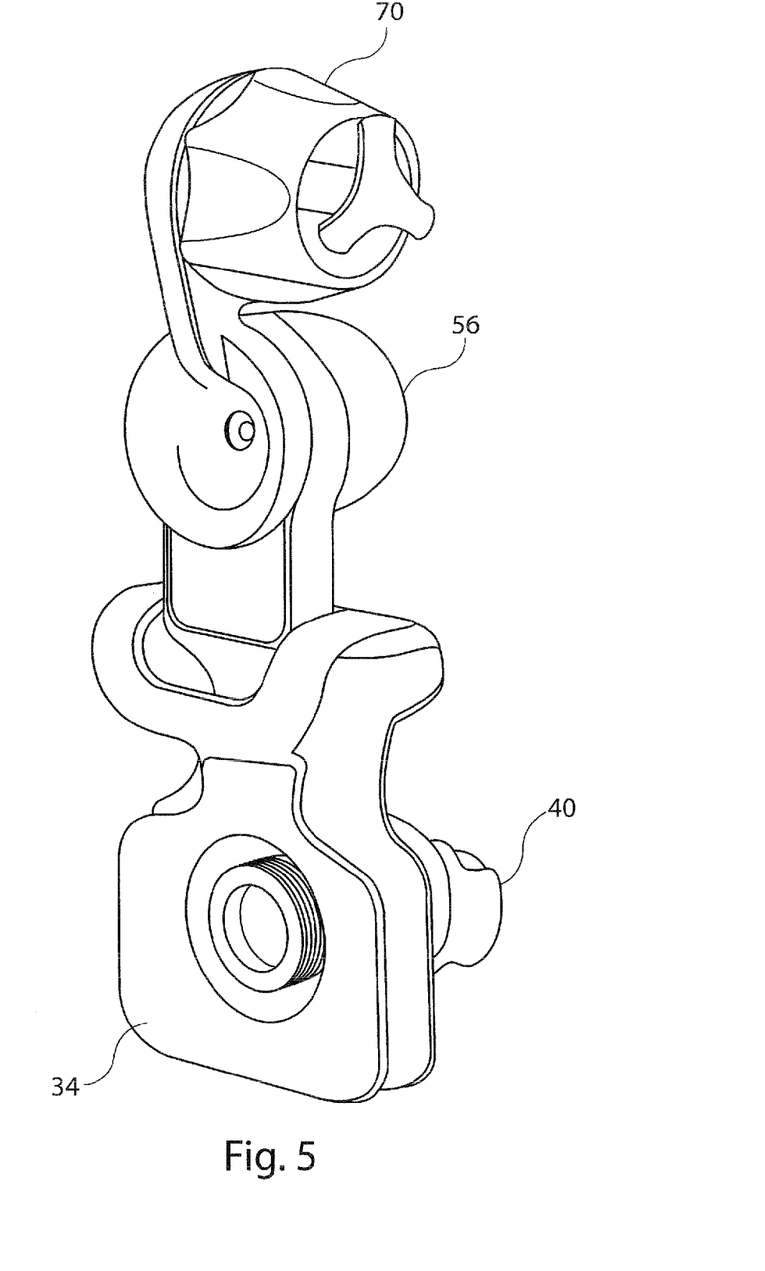
FIG. 5 is a rear perspective view of the bracket portion.
Figure 6:
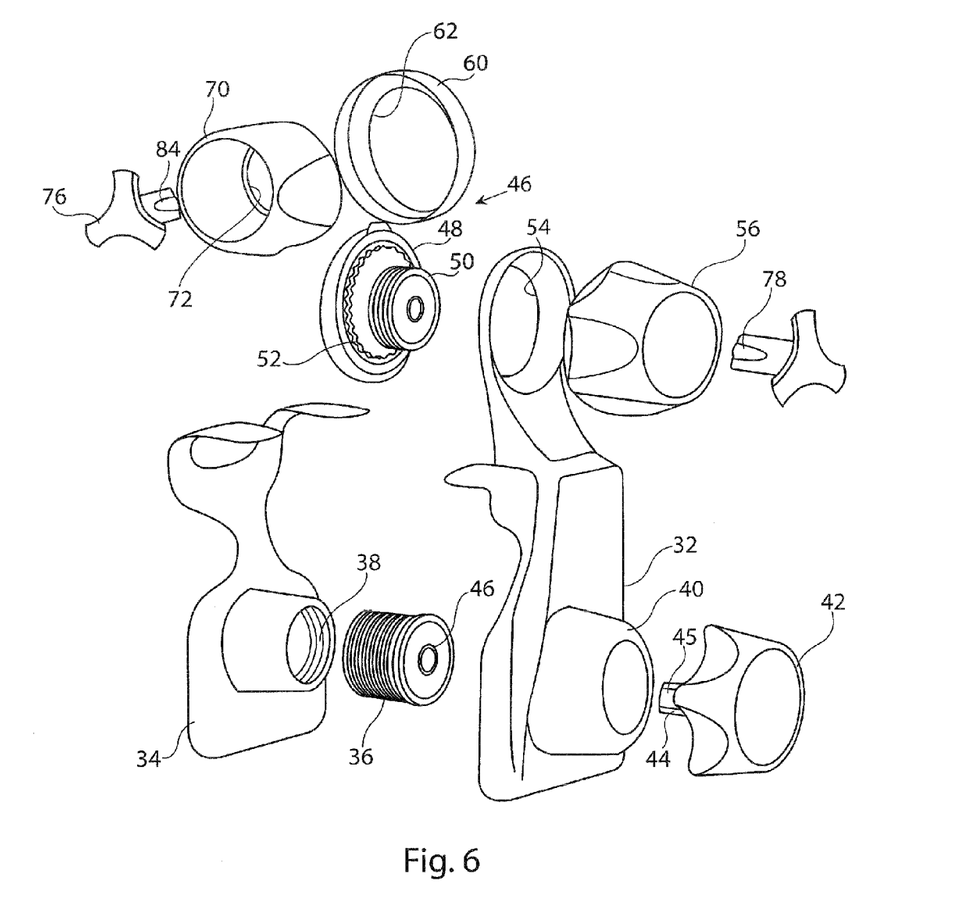
FIG. 6 is an exploded view of the bracket portion.
Figures 7, 8:
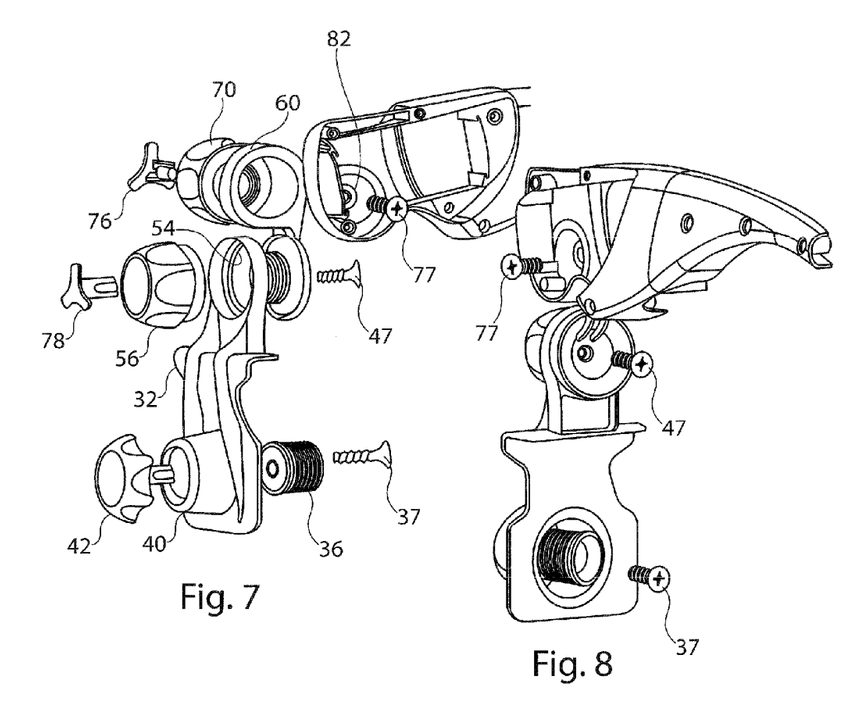
FIG. 7 an exploded view of the bracket and a portion of the mobile assembly of FIG. 1.
FIG. 8 is an assembled view of the bracket and a portion of the mobile assembly of FIG. 1.

Referring now to FIGS. 4-6, the bracket assembly system 14 comprises a lower bracket 30 comprising a front plate 32 and a hack plate 34 sized and shaped to fit over a crib rail 16. The front plate 32 and back plate 34 are fixed together by a threaded attachment bolt 36 which in turn is threaded into receiving threads 38 in the back plate 34. Front plate 32 has a hub 40 sized and shaped to accommodate attachment bolt 36. A knob 42 includes a triangular-shaped shaft 44 having bosses or prongs 45 which is fitted into a receiving hub 46 in attachment bolt 36. Referring to FIGS. 7 and 8, there is a screw 37 for fastening the attachment bolt 36 to the lower knob 42, entering the hollow end of the bolt 36 inserts through the hack of the attachment bolt 45 into the shaft 44 of the knob 42. The attachment bolt 36 and lower knob 42 capture the hub 40 of the front plate 32.

The bracket assembly system 14 also includes an upper bracket 48 which in turn is rotatably mounted to an upper end of lower bracket 32. Bracket 46 includes a lower portion 50 which includes a threaded extension 52 and a cogged section 54 which is sized and shaped to mesh with a cogged section 54 in an upper end of lower bracket 32. Upper bracket 48 is rotatably attached to lower bracket 32 by an internally threaded knob 56 which is sized and shaped to engage with threads 50 of upper bracket 48. Referring to FIGS. 7 and 8, there is a screw 47 that enters the bracket 46 from the back/inside of the threads 50 into the retainer piece 78 capturing both the front plate 32 upper ring 54 and the nut 56.

Upper bracket 48 also includes an upper ring 60 which is orthogonally (90°) offset from the lower portion. Ring 60 also includes internal cogged ring 62 for engaging with an external cogged shaft (not shown) on the proximal end of the mobile handle 12. The cogged shaft also includes external threads (not shown).

Completing the assembly is an upper knob 70 which includes internal threads 72 for engaging with the external threads 80 on a threaded shaft 82 (shown in phantom in FIG. 1) at the proximal end of arm 12, and a triangular retainer element 76 which is in turn fitted to shaft 82. As seen in FIG. 6, retainer element 76 includes raised bosses or prongs 84, for engaging with shaft 82. Referring to FIGS. 7 and 8, there is a screw 77 that enters the back/inside of the mobile arms 12 threads 82 into the upper retainer part 76 and captures the ring portion 60 of the joint bracket 46 and the upper nut 70.

As will be appreciated, the bracket arrangement above described permits easy adjustment of the mobile in both a vertical position and a horizontal position. All that is necessary to adjust the vertical height is a quick turn of knob 70. By the same token, to adjust the horizontal position one needs only to loosen knob 56.

Figures 9, 10:
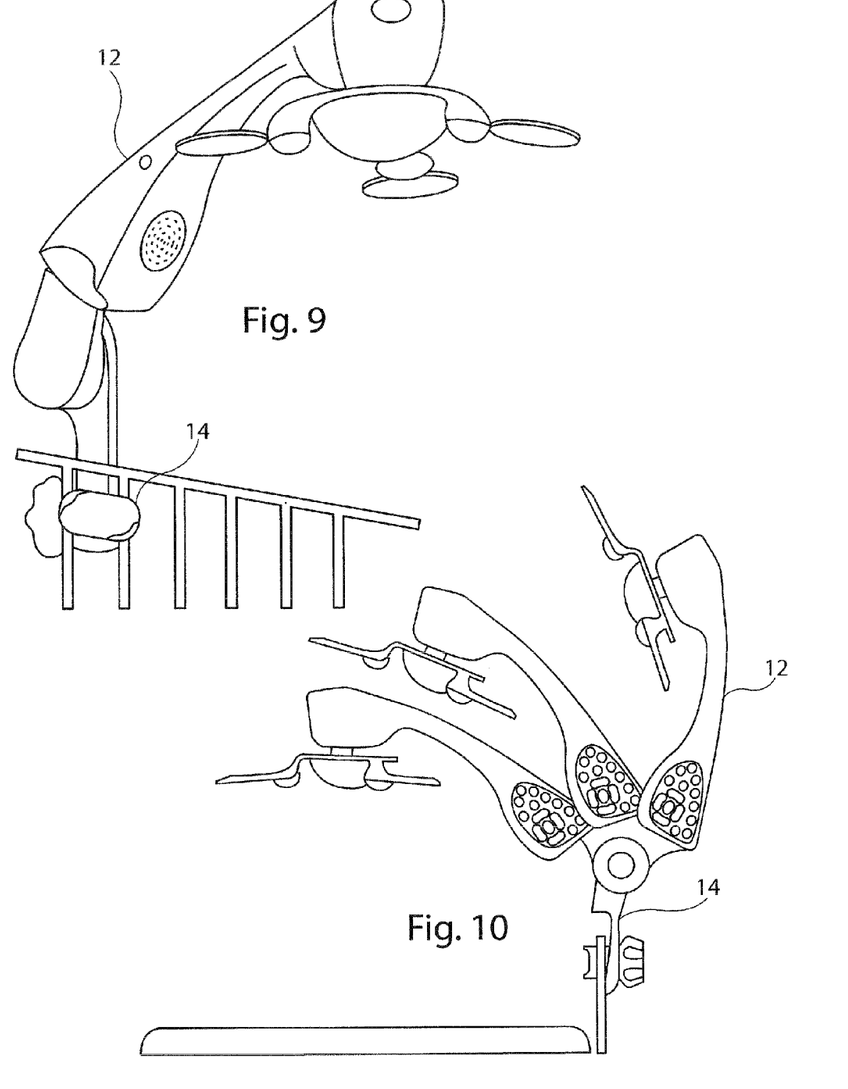
FIG. 9 is a perspective view of an alternative embodiment of a mobile assembly in accordance with the present invention.
FIG. 10 is a side elevational view of the mobile assembly of FIG. 9.
Figure 11:
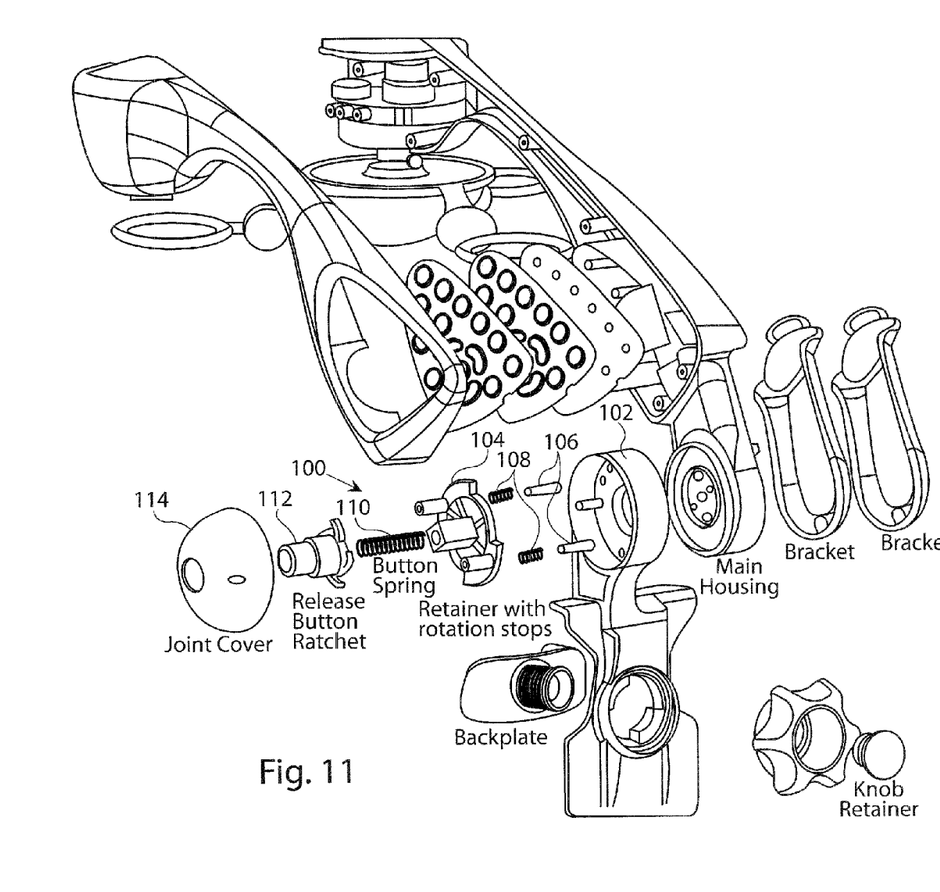
FIG. 11 is an exploded view of the mobile assembly of FIG. 9.

Alternatively, as illustrated in FIGS. 9-11, it is sufficient in most cases to rotatably attach the proximal end of arm 12 directly to bracket 14 via rotatable joint 100. While rotatably mounting arm 12 directly to bracket 14 eliminates the rotatable joint that allows the mobile to be moved from side to side, for most purposes, it is sufficient to rotatably mount the mobile arm 12 directly to the support bracket 14 since the mobile arm can still be raised directly up and out of the way, for example, in case of an emergency.

Referring in particular to FIG. 11, rotatable joint 100 includes a housing 102 on which is mounted a canned retainer 104 having detents 106. Retainer 104 is floated on springs 108. A spring and 110 loaded release button ratchet 112 controls the retainer, and rejects through an aperture in a joint cover 114. The advantage of this construction is that the unit may be tilted up and out of the way without pressing the button so that the neck can be moved quickly. The release button 112 can be then pressed to move the unit back into position.

A further feature and advantage of the mobile of the invention is that the several parts readily may be loosened enough for cleaning and sterilization.

That is to say, the parts for this mobile are constructed of materials that can be disinfected and it is assembled in such a way that all joints can be loosened enough to allow complete disinfecting. All connecting parts allow just enough spacing to allow fingers to reach to all of the surfaces to be completely disinfected.

Also, the parts for this mobile are assembled in such a way that they can be loosened enough to allow cleaning, but do not completely detach. This will keep parts from being lost or separated from the mobile when handled or cleaned. For the pivoting joints, the retainers with the triangular pronged ends are holders for the nuts to keep them from coming off of units. For the crib attachment portion the lower knob and the attachment bolt captures the bracket, so that the bolt does not completely separate from the unit.

While the present invention has been described particularly with reference to a mobile for a crib, the invention also advantageously may be used for providing mobiles to playpens, cradles, changing tables and the like.

Various changes may be made without departing from the spirit and scope of the present invention. For example, in some instances it may be sufficient to include just one pivoting joint, so as to provide only vertical movement, e.g. as illustrated in FIGS. 9 and 10, or only horizontal movement. Also, one or more of the rotatable brackets may restrict movement via friction. Still other changes are possible without departing from the spirit and scope of the invention.

What is claimed is:

1. A mounting assembly for mounting a mobile toy to a rail and for supporting said mobile toy on said rail, said mounting assembly comprising a first joint and a lower bracket, the joint permitting the mobile toy to move vertically up and down, the lower bracket attaching to the rail and supporting the joint,
   wherein the lower bracket includes a first plate and a second plate, wherein the first plate has a hub with a hole through the hub, and the second plate has receiving threads, wherein the first plate and the second plate are secured to one another by a threaded bolt having a knob and shaft fixed to one end of the threaded bolt by a fastener,
   wherein the shaft fits through the hole in the hub, and wherein the hub is captured between the knob and the threaded bolt.

2. The assembly of claim 1, wherein the threaded bolt is fixed to the shaft by a screw.

3. A crib toy comprising a mounting assembly as claimed in claim 1, and a mobile including an arm having a plurality of targets suspended from a distal end of the arm, attached at its proximal end to the mounting bracket assembly.

4. The crib toy of claim 3, wherein the crib mobile includes a rotation mechanism for rotating the targets, wherein the rotation mechanism comprises a spring-driven or battery driven motor.

5. The mounting assembly of claim 1, wherein surfaces of said mounting assembly are configured to be accessible for cleaning.

6. The assembly of claim 1, further including a second joint which is 90° offset to the first joint, the second joint permitting the mobile toy to move horizontally from side to side parallel to the rail.

7. A mounting assembly for mounting a mobile toy to a rail and for supporting said mobile toy on said rail, said mounting assembly comprising a joint and a bracket, the joint permitting the mobile toy to move vertically up and down, and the bracket attaching to the rail and supporting the joint,
   wherein the bracket includes a first plate and a second plate, wherein the first plate has a hub with a hole through the hub, and the second plate has receiving threads, wherein the first plate and the second plate are secured to one another by a threaded bolt having a knob and shaft fixed to one end of the threaded bolt by a fastener,
   wherein the shaft fits through the hole in the hub, and wherein the hub is captured between the knob and the threaded bolt.

8. The assembly of claim 7, wherein the joint and bracket are constructed to be loosened to permit disinfecting, but include retainers which prevent the joint bracket from becoming completely detached.

9. A crib toy comprising a mounting assembly as claimed in claim 7, and a mobile including an arm having a plurality of targets suspended from a distal end of the arm, attached at its proximal end to the mounting bracket assembly.

10. The crib toy of claim 9, wherein the mobile includes a rotation mechanism for rotating the targets.

11. The crib toy of claim 10, wherein the rotation mechanism comprises a spring-driven or battery driven motor.

12. A mounting assembly for mounting a mobile toy to a rail and for supporting said mobile toy on said rail, said mounting assembly comprising an upper bracket and a lower bracket, the lower bracket also attaching to the rail and supporting the upper bracket,
    wherein the lower bracket includes a first plate and a second plate, wherein the first plate has a hub with a hole through the hub, and the second plate has receiving threads, wherein the first plate and the second plate are secured to one another by a threaded bolt having a knob and shaft fixed to one end of the threaded bolt by a fastener,
    wherein the shaft fits through the hole in the hub, and wherein the hub is captured between the knob and the threaded bolt.

13. The assembly of claim 12, wherein the upper bracket permits the mobile toy to be moved vertically.

14. The assembly of claim 12, wherein the wherein the upper and lower brackets are constructed to be loosened to permit disinfecting, but include retainers which prevent the bracket from becoming completely detached.

15. A crib mobile comprising a mounting assembly as claimed in claim 12, and a mobile including an arm having a plurality of targets suspended from a distal end of the arm, attached at its proximal end to the mounting bracket assembly.

16. The mobile of claim 15, wherein the crib mobile includes a rotation mechanism for rotating the targets.

17. The mobile of claim 16, wherein the rotation mechanism comprises a spring-driven or battery driven motor.

* * * * *